June 18, 1935.  P. O. LANGGUTH  2,004,954
POTENTIAL DEVICE
Filed Nov. 11, 1933
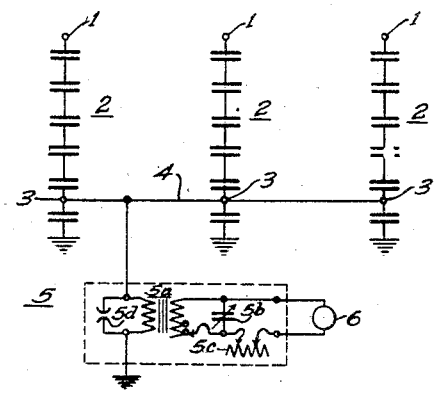
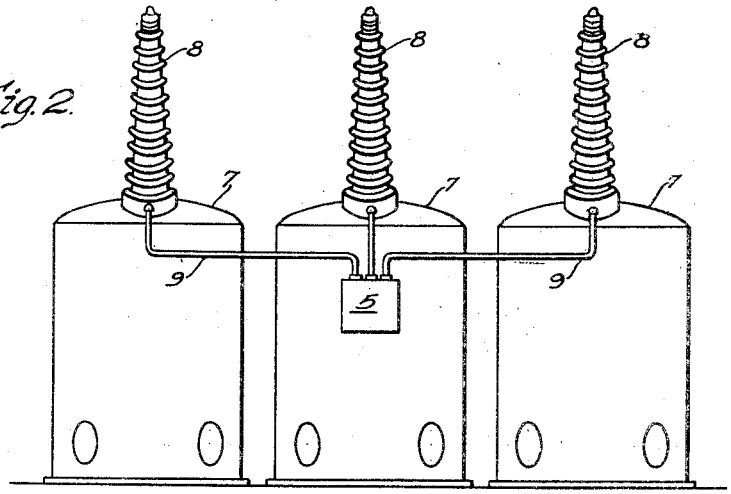
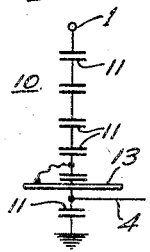
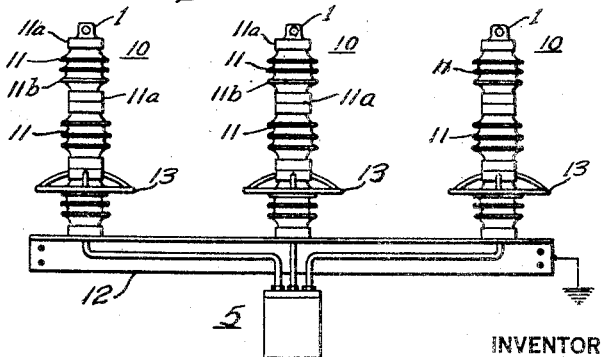
WITNESSES:
C. J. Weller
Geo. O. Harrison
INVENTOR
Paul O. Langguth.
BY
ATTORNEY Patented June 18, 1935

2,004,954

UNITED STATES PATENT OFFICE 2,004,954

POTENTIAL DEVICE

Paul O. Langguth, Irwin, Pa., assignor to Westinghouse Electric & Manufacturing Company, East Pittsburgh, Pa., a corporation of Pennsylvania Application November 11, 1933, Serial No. 697,676

14 Claims. (Cl. 171—97)

My invention relates to high voltage alternating current systems and particularly to electrostatic apparatus for obtaining a control voltage proportional to the residual or zero sequence voltage of a polyphase alternating current circuit.

In connection with polyphase alternating current circuits, it is often necessary to obtain an accurate indication of the zero sequence voltage of a high voltage polyphase circuit in order to detect and clear ground faults. Such an indication may be obtained by means of insulating potential transformers, but the cost of such transformers for transmission voltages is considerable, and it is preferable to obtain the indication by means of capacitive apparatus, where possible.

As capacitive apparatus has heretofore been applied for this purpose, it has been the practice to use three bushing potential devices, each separately connected to a tapped condenser-type bushing, for obtaining the zero sequence voltage. In this arrangement, the secondary windings of the potential device transformers are connected in a series circuit with the translating device to which the zero sequence voltage is to be applied. I have found that this arrangement may be greatly simplified and two of the potential devices omitted if the connections are made in a manner which will be hereinafter described.

Moreover, where the load connected to the potential devices was relatively great, as compared to the available capacities of the tapped bushings, slight errors in the voltage-ratios and phase-angle relations were encountered in the previous arrangement which utilized three separate bushing potential devices and an auxiliary residual-voltage transformer having an open-delta secondary. These errors would cause a residual voltage to appear in this open-delta secondary when there was no unbalance in the line-voltages.

It is, accordingly, an object of my invention to provide a novel arrangement of capacitive apparatus for obtaining zero sequence voltage, which shall require only one bushing potential device or equivalent transforming device, and which shall avoid the errors previously encountered.

Other objects of my invention include the provision of a novel form of external-gap-protected potentiometer device, and more particularly a pedestal - type capacitor - potentiometer which constitutes an element or sub-combination of the zero-sequence potential device previously mentioned.

The foregoing and other objects will become evident from the following detailed description taken in conjunction with the accompanying drawing, in which Figure 1 is a diagrammatic view of a novel system of connections embodying my invention, Fig. 2 is an elevational view of a set of oil circuit breakers showing a preferred arrangement of parts in the application of my invention to condenser bushing apparatus, Fig. 3 is an elevational view showing a modification of my invention as used with pedestal mounted coupling capacitors, and Fig. 4 is a diagrammatic view showing the internal connections of certain of the capacitors of Fig. 3.

Referring to Fig. 1, the phase conductors 1 of a three-phase grounded-neutral transmission line are insulated from ground by three symmetrical series capacitance devices 2. The series capacitance devices 2 may be condenser-type bushings, strings of insulators, stacks of condensers or other capacitive coupling devices or capacitor-potentiometers which draw a charging current and are capable of being tapped to produce a comparatively small fraction of the total impressed voltage.

The capacitance devices 2 are each tapped near their ground ends at points 3 corresponding to equal fractions of the total capacitive reactance of the corresponding device, and the points 3 are connected by a common conductor 4.

A bushing potential device or network 5 is connected between the conductor 4 and ground. The potential device 5 may be of the type commonly used with a single condenser bushing, except that its turn ratio is somewhat lower to compensate for capacitance effects which will be hereinafter more fully explained.

The potential device 5 comprises a step-down transformer 5a, an adjustable condenser 5b connected across the secondary terminals of the transformer 5a, and an adjustable reactor 5c including in series with the secondary winding of the transformer 5a. A spark gap 5d is connected in parallel with the primary winding of the transformer 5a, for preventing an excessive voltage on the tapped portion of the capacitance devices 2 in the event that the potential device 5 becomes overloaded. The spark gap 5d also serves to by-pass high voltage transients caused by lightning, switching operations or other disturbances, in a manner well understood in the art.

The translating device 6, to be energized by the potential device 5, is connected in series with the reactor 5c and the secondary winding of the transformer 5a. The translating device 6 may be a meter, relay, glow lamp or other device responsive to voltage. In many cases, it would be the potential coil of a ground relay.

The adjustments of the transformer 5a, condenser 5b and reactor 5c are provided for varying the magnitude and phase angle of the output voltage of the device 5 to obtain most satisfactory operation for a given line voltage, voltage ratio of the capacitance devices 2 and burden.

The potential device, comprising the transformer 5a, the capacitor 5b, and the inductor 5c, is substantially the same as that covered by a patent to J. F. Peters, No. 1,819,260, patented August 18, 1931. The inductor 5c is an iron-core inductor having sufficient inductance to the fundamental line-frequency currents to provide a tuned relaying-voltage circuit so as to compensate for the phase-angle displacement across those portions of the capacitor-potentiometers 2 which are included between the common conductor 4 and ground. Thus, it will be obvious that the essential purpose of the inductor 5c is to make the inductive reactance of the entire circuit or potential-network 5 substantially equal and opposite to the capacitive reactance between the common conductor 4 and ground, and hence, as indicated in said Peters patent, the inductor 5c may be connected in either the primary or the secondary circuit of the transformer 5a.

The capacitor 5b which is preferably shunted across the secondary winding of the transformer 5a, as shown, is a small adjustable capacitor which aids in the adjustment of the secondary voltage and also improves the voltage-regulation of the device.

The adjustments are preferably made as follows: With one of the conductors 1 grounded, equal voltages of normal value which are displaced by 120°, are applied between the other two conductors 1 and ground. The transformer 5a, condenser 5b and reactor 5c are then adjusted to produce an output voltage across the translating device 6 of approximately 110 volts, displaced by 60° from both of the applied voltages. It will be noted that under these conditions, there are four parallel paths between the conductor 4 and ground, three paths being through the short portions of the capacitance device 2 and one path being through the long portion of the grounded capacitance device 2. The total capacitance between the conductor 4 and ground is accordingly considerably higher than that of a single short portion of one of the capacitance devices 2. For this reason, the voltage between the conductor 4 and ground is lower than that which would be produced by a single device 2 acting as an unloaded potentiometer, and, the turn ratio of the step-down transformer 5a must be lower than that of the usual potential device transformer, as mentioned above.

The operation of the apparatus shown in Fig. 1 may be set forth as follows: It is assumed that the connection to ground has been removed from the conductor 1 which was grounded to adjust the device 5, and that normal three-phase voltage is applied to the conductors 1. As long as the voltages applied to the conductors 1 remain balanced, the charging currents of the capacitance devices add vectorially to zero in the common conductor 4 and no current flows through the short portions of the capacitance devices 2. The voltage between the conductor 4 and ground is accordingly zero. If the line voltages become unbalanced, a resultant voltage to ground exists, and a resultant of the charging currents of the capacitance devices 2 flows from the conductor 4 through the primary winding of transformer 5a to ground. This resultant of the charging currents induces a voltage in the secondary winding of the transformer 5a and currents flow through the condenser 5b and translating device 6.

The voltage existing across the translating device 6 under these conditions is proportional to the vector sum of the line voltages and is in phase with this vector sum, neglecting frequency variations and non-linear effects such as magnetic saturation. This relationship is believed to be sufficiently obvious from the symmetry of the arrangement, and proof is accordingly omitted.

Fig. 2 shows a preferred arrangement of my invention as applied to condenser-bushing apparatus. In Fig. 2, three circuit breakers of a high voltage polyphase circuit are shown at 7. The potential device 5 is preferably mounted upon the central circuit-breaker tank 7 and connected to taps of the bushings 8 of the circuit breaker. The connections are preferably completely enclosed in weatherproof conduits 9.

In the application of my invention to condenser bushing apparatus, a small rise of voltage per layer results from the fact that the insulating effect of the layer closest to ground is lost. For example, in Fig. 1, the star voltages are impressed between the conductors 1 and the tapping points 3 rather than between conductors 1 and ground. It is therefore necessary that the bushings have sufficient factors of safety to withstand the increased voltage.

Fig. 3 shows a preferred arrangement of my invention as practiced with pedestal mounted coupling capacitors. Three similar stacks 10, each consisting of a suitable number of coupling capacitors 11, in this case three, are mounted upon a grounded support 12 and are connected to the conductors 1. Each of the stacks 10 is provided with an arcing ring 13 metallically connected between the lowermost coupling capacitor and the one next above.

The coupling capacitors 11 are each provided with metallic housing-terminals or end plates 11a and with an outer insulating housing or casing 11b of porcelain or other suitable insulating material. The condenser elements, shown in Fig. 4, are the usual conducting and dielectric layers stacked within the casings 11b. The porcelain casings 11b are so designed that the break-down voltage outside of the casing is lower than the break-down voltage of the condenser elements therewithin, so that an insulation failure will occur externally as a flashover rather than internally, if a failure should occur.

The internal connections of the capacitors 11 of Fig. 3 are indicated in Fig. 4. The lowermost capacitor 11 of each stack is tapped at its mid-point, and the conductor 4 is connected to the tap. The bottom unit 11 thus constitutes, in effect, a mutiple-capacitor unit having (as shown) two serially connected capacitor-elements therein, and having an intermediate tap-connection between said capacitor-elements. As shown in Figs. 3 and 4, a tap-conductor 4 extends from said tap-connection and passes through the bottom housing-terminal or end plate 11a and also through the grounded supporting means 12. As the mid-tap of the lowermost capacitor 11 has the effect of reducing the internal break-down voltage of the capacitor, the arcing rings 13 are provided for correspondingly reducing the external break-down voltage of the lowermost capacitor 11 to insure an external flashover in the event of excessive voltage, rather than an internal failure.

The external flashover-path or arcing space between the arcing ring 13 of the bottom capacitor-potentiometer unit 11 and the bottom terminal plate 11a or the grounded terminal-structure 12 thus makes it impossible for the tap-conductor 4 to become directly connected to the high voltage of the line-conductor 1 through an internal insulation-failure within the bottom unit 11 and external flashovers around the two top units 11 of the series. Thus, if an arc should strike from the conductor 1 to the ring 13 of Fig. 4, it would also strike from the ring 13 to ground, so that its path to ground would therefore be external to the lowermost capacitor 11. The contingency of the arc reaching the conductor 4 is remote, as the porcelain insulator 11b of the lowermost capacitor 11 would have to be punctured before this could happen.

I do not intend that the present invention shall be restricted to the specific structural details, arrangement of parts or circuit connections herein set forth as various modifications thereof may be effected without departing from the spirit and scope of my invention. I desire therefore that only such limitations shall be imposed as are indicated in the appended claims.

I claim as my invention:

1. In combination with a grounded-neutral polyphase alternating current circuit, apparatus responsive to a zero sequence component of voltage of said circuit comprising a plurality of capacitance means each coupling a phase conductor of said circuit to ground, said capacitance means having conducting elements which divide their respective capacitive reactances in the same predetermined ratio, a conductor connecting said conducting elements directly together, and an electroresponsive device connected between said conductor and ground.

2. In combination with a grounded-neutral polyphase alternating-current circuit, apparatus responsive to a zero sequence component of voltage of said circuit comprising a plurality of series capacitance means, each connected between a phase conductor of said circuit and ground, each of said capacitance means comprising a plurality of capacitors connected in a series circuit, a conductor connecting a point of one of said series circuits directly to the corresponding points of the other of said series circuits, and an electroresponsive device connected between said conductor and ground.

3. In combination with a grounded-neutral high-voltage polyphase alternating-current circuit, apparatus responsive to a zero sequence component of voltage of said circuit comprising a plurality of series capacitance means each connected between a phase conductor of said circuit and ground, each of said capacitance means comprising a plurality of capacitors connected in a series circuit, said capacitors each having an insulating casing, a conductor connecting points within said casings of a predetermined capacitive reactance to ground of each of said series circuits directly together, an electro-responsive device connected between said conductor and ground, and protective electrode means connected to said conductor and in arcing relationship to ground.

4. A capacitor coupling device comprising a plurality of serially connected capacitor-units, each of said units having an insulating housing with capacitor-means therewithin, and conducting terminals for said housing, said terminals being so spaced that an external flashover-path is provided around each individual unit, having a flashover-voltage which is considerably lower than the internal insulation-puncture-strength of the capacitor-means within the unit-housing, means for making an electric circuit connection from one end of the series to a transmission-line conductor, and grounded means for the other end of the series, characterized by the unit at the grounded end being a multiple-capacitor unit having a plurality of serially-connected capacitor-elements therewithin, and having an intermediate tap-connection between two of said serially connected capacitor-elements, and a tap-conductor extending from said intermediate tap-connection through the housing-terminal at the grounded end of said unit.

5. A pedestal-type coupling device comprising a plurality of serially connected capacitor-units, each of said units having an insulating housing with capacitor-means therewithin, and conducting terminals for said housing, said terminals being so spaced that an external flashover-path is provided around each individual unit, having a flashover-voltage which is considerably lower than the internal insulation-puncture-strength of the capacitor-means within the unit-housing, means for making an electric-circuit connection from the top end of the series to a transmission-line conductor, a grounded base for the bottom end of the series, and fastening means for securing the several parts together in pedestal-formation, characterized by the bottom unit being a multiple-capacitor unit having a plurality of serially connected capacitor-elements therewithin, and having an intermediate tap-connection between two of said serially connected capacitor-elements, and a tap-conductor extending from said intermediate tap-connection through the bottom terminal member of said bottom unit.

6. A capacitor-potentiometer coupling device comprising a multiple-capacitor unit having an insulating housing with a plurality of serially connected capacitor-elements therewithin, and conducting terminals for said housing, said terminals being so spaced that an external flashover-path is provided around said unit, having a flashover-voltage which is considerably lower than the internal insulation-puncture-strength of the capacitor-elements within the unit-housing, means for making an electric-circuit connection from one end of the series to a transmission-line conductor, and grounded means for the other end of the series, characterized by said capacitor-unit having an intermediate tap-connection between two of said serially connected capacitor-elements, and a tap-conductor extending from said intermediate tap-connection through the housing-terminal at the grounded end of said unit.

7. A pedestal-type capacitor-potentiometer coupling device comprising a multiple-capacitor unit having an insulating housing with a plurality of serially connected capacitor-elements therewithin, and conducting terminals for said housing, said terminals being so spaced that an external flashover-path is provided around said unit, having a flashover-voltage which is considerably lower than the internal insulation-puncture-strength of the capacitor-elements within the unit-housing, means for making an electric-circuit connection from the top end of the series to a transmission-line conductor, a grounded base for the bottom end of the series, and fastening means for securing the capacitor-unit and the base together in pedestal-formation, characterized by said capacitor unit having an intermediate tap-connection between two of said serially connected capacitor-elements, and a tap-conductor extending from said intermediate tap-connection through the bottom terminal member of said capacitor-unit.

8. A potentiometer-coupling device comprising a plurality of serially connected potentiometer-element units, each of said units having an insulating housing with potentiometer-element means therewithin, and conducting terminals for said housing, said terminals being so spaced that an external flashover-path is provided around each individual unit, having a flashover-voltage which is considerably lower than the internal excess-voltage strength of the potentiometer-element means within the unit-housing, means for making an electric-circuit connection from one end of the series to a transmission-line conductor, and grounded means for the other end of the series, characterized by the unit at the grounded end being a multiple-element unit having a plurality of serially connected potentiometer-elements therewithin, and having an intermediate tap-connection between two of said serially connected potentiometer-elements, and a tap-conductor extending from said intermediate tap-connection through the housing-terminal at the grounded end of said unit.

9. A pedestal-type potentiometer-coupling device comprising a plurality of serially connected potentiometer-element units, each of said units having an insulating housing with potentiometer-element means therewithin, and conducting terminals for said housing, said terminals being so spaced that an external flashover-path is provided around each individual unit, having a flashover-voltage which is considerably lower than the internal excess-voltage strength of the potentiometer-element means within the unit-housing, means for making an electric-circuit connection from the top end of the series to a transmission-line conductor, a grounded base for the bottom end of the series, and fastening means for securing the several parts together in pedestal formation, characterized by the bottom unit being a multiple-potentiometer unit having a plurality of serially connected potentiometer-elements therewithin, and having an intermediate tap-connection between two of said serially connected potentiometer-elements, and a tap-conductor extending from said intermediate tap-connection through the bottom terminal member of said bottom unit.

10. A potentiometer-coupling device comprising a multiple-potentiometer unit having an insulating housing with a plurality of serially connected potentiometer elements therewithin and conducting terminals for said housing, said terminals being so spaced that an external flashover-path is provided around said unit, having a flashover-voltage which is considerably lower than the internal excess-voltage strength of the potentiometer-elements within the unit-housing, means for making an electric-circuit connection from one end of the series to a transmission-line conductor, and grounded means for the other end of the series, characterized by said potentiometer-unit having an intermediate tap-connection between two of said serially connected potentiometer-elements, and a tap-conductor extending from said intermediate tap-connection through the housing-terminal at the grounded end of said unit.

11. A pedestal-type potentiometer-coupling device comprising a multiple-potentiometer unit having an insulating housing with a plurality of serially-connected potentiometer-elements therewithin, and conducting terminals for said housing, said terminals being so spaced that an external flashover-path is provided around said unit having a flashover-voltage which is considerably lower than the internal excess-voltage strength of the potentiometer-elements within the unit-housing, means for making an electric-circuit connection from the top end of the series to a transmission-line conductor, a grounded base for the bottom end of the series and fastening means for securing the potentiometer-unit and the base together in pedestal-formation, characterized by said potentiometer-unit having an intermediate tap-connection between two of said serially connected potentiometer-elements, and a tap-conductor extending from said intermediate tap-connection through the bottom terminal member of said potentiometer-unit.

12. A zero-sequence capacitor-potentiometer coupling device for a polyphase transmission line, comprising an individual capacitor-potentiometer connected between each phase-conductor of the transmission line and ground, a common intermediate-tap conductor for all of said capacitor-potentiometers, and a tuned-circuit adjustable voltage-network assembly connected between said common tap conductor and ground for providing a low-voltage source substantially responsive, in predetermined manner, and in phase and magnitude, to the zero-sequence component of the transmission-line voltage.

13. The invention as specified in claim 12, characterized by said voltage-network assembly comprising a potential transformer including serially connected tuned-circuit inductance.

14. A zero-sequence potentiometer coupling device for a polyphase transmission line, comprising an individual potentiometer connected between each phase-conductor of the transmission line and ground, a common intermediate-tap conductor for all of said potentiometers, and an adjustable voltage-network assembly connected between said common tap conductor and ground for providing a low-voltage source substantially responsive, in predetermined manner, and in phase and magnitude, to the zero-sequence component of the transmission-line voltage.

PAUL O. LANGGUTH.